Nov. 13, 1934.         P. W. ROBINSON         1,980,830
REGENERATIVE BRAKING OF ALTERNATING CURRENT COMMUTATOR MOTORS
Filed May 31, 1934

Inventor:
Percy W. Robinson,
by Harry E. Dunham
His Attorney.

Patented Nov. 13, 1934

1,980,830

UNITED STATES PATENT OFFICE 1,980,830

REGENERATIVE BRAKING OF ALTERNATING-CURRENT COMMUTATOR MOTORS

Percy W. Robinson, Scotia, N. Y., assignor to General Electric Company, a corporation of New York Application May 31, 1934, Serial No. 728,243

7 Claims. (Cl. 172—179)

My invention relates to the control of alternating-current commutator motors and in particular to a regenerative-braking control for quickly lowering the speed or stopping such motors. The invention preferably includes means whereby the motor supply circuit is automatically opened as soon as the desired speed reduction has been accomplished in order to guard against overheating, damage to the commutator, and waste of energy.

My invention is hereinafter explained as applied to the type of motor described in United States Reissue Patent No. 14,031 to Schrage, December 14, 1915. In this type of motor, the primary member, usually the rotor, is provided with a regulating winding which is connected to the phase ends of a non-interlinked multi-phase secondary winding on the stator of the motor through a commutator and sets of adjustable brushes. The speed of the motor may be varied through quite wide limits by adjustment of the commutator brushes. It is, however, impossible to reduce the speed to zero by this method and, moreover, it is oftentimes desirable to reduce the speed or stop the motor very quickly and without disturbing the speed setting of the adjustable brushes. A solenoid brake has sometimes been used for stopping such motors but a solenoid brake takes up valuable space and its maintenance cost is high.

In carrying my invention into effect, I utilize a portion of the same commutated and secondary winding parts as are used for normal motor operation but so change the circuit connections between these parts as to produce a regenerative-braking torque which is or may be made effective at all speeds down to standstill. I prefer not to use the speed control brushes for the regenerative-braking circuit or circuits as this would unnecessarily complicate the control. Instead, I provide additional brushes on the commutator for this purpose. The speed control brush circuits are then opened and the regenerative-braking brush circuit closed when it is desired to stop the motor. This avoids disturbing the speed control brush setting and, moreover, allows of a very quick stopping. The primary winding, which remains energized during regenerative braking, is deenergized automatically as soon as or shortly after the motor stops.

Figure 1:
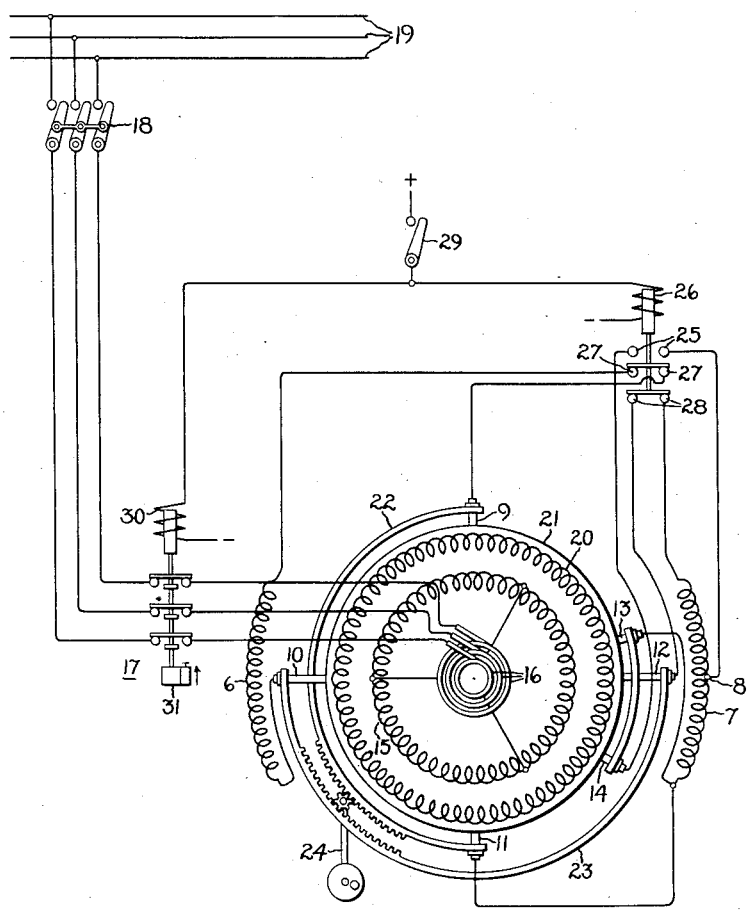
Figure 2:
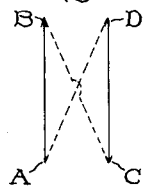

The features of my invention which are believed to be novel and patentable will be pointed out in the claims appended hereto. For a better understanding of my invention, reference is made in the following description to the accompanying drawing illustrating in Fig. 1 the motor and the control circuits pertaining to my invention, and Fig. 2 represents a vector diagram of certain voltage and phase relations existing in the braking circuit of the motor at standstill.

In the drawing, I have represented a Schrage-type commutator motor having a three-phase primary and a two-phase secondary. I do not wish to be understood as confining my invention to a two-phase secondary but its illustration reduces the number of brush circuits to be represented and thus shows a practicable embodiment of the invention in a simple manner. Also, other control features that would usually be used with such a motor have been omitted from the illustration.

The primary rotor-energizing winding is represented at 15 connected through slip rings 16, through an automatic control switch 17 and line switch 18 to a three-phase source of supply 19. The primary winding 15 may be connected to the commutator 21 as pointed out by Schrage but it is generally preferable to connect the commutator to a lower voltage winding 20 inductively related to the primary winding 15.

The non-interlinked multi-phase secondary winding on the stator is represented by the coils 6 and 7 and the speed control brushes connected thereto comprise the brushes 9 and 10 connected to the opposite ends of phase 6 and the brushes 11 and 12 connected to the opposite ends of secondary winding phase 7. Brushes 9 and 11 are on one brush ring 22 and brushes 10 and 12 on another brush ring 23. It is well understood that, by varying the voltage between the brushes connected to the secondary winding by shifting such brushes towards and away from each other on the commutator, the motor speed may be varied; also that, by shifting the axes of these brushes with respect to the windings to which they are connected, the power factor of the motor may be varied. Since I do not disturb this well known brush arrangement, any of the prior art brush riggings for shifting these brushes in a desirable manner for accomplishing both purposes simultaneously may be employed. An example of a brush-shifting arrangement of this character is illustrated in United States Patent No. 1,590,030 to Hull, June 22, 1906.

For the purposes of this invention, it will be sufficient to merely indicate mechanism for shifting the brushes for speed or power-factor control or both by the device 24.

For regenerative-braking purposes, I provide at least one additional pair of brushes 13 and 14, which are adapted to be connected across a suitable part of the secondary winding through switch contacts 25. The relay 26 which controls contacts 25 also controls other contacts 27 and 28 which are included in the speed control brush circuits of the motor. Thus, contacts 27 are included in a circuit consisting of secondary winding 6 and its brush connections 9 and 10, and contacts 28 are similarly included in the circuit of secondary winding 7 and its brushes 11 and 12.

It will be noted that, when contacts 27 and 28 are closed for normal motor operation, the regenerative-braking circuit is open at contacts 25 and, when the latter circuit is closed, the normal secondary speed control circuits are open. The two switching means for establishing motor operation and regenerative-braking operation are thus interlocked to prevent both being closed at the same time.

The relay 26 and contacts thereof may be controlled by a remote switch 29 which will be open and relay 26 deenergized for normal motor operation. This condition is represented in the drawing. Switch 29 also preferably controls the energizing coil 30 of switch 17 contained in the primary energizing circuit of the motor. In such case, switch 17 is closed when its operating coil is deenergized and this switch has a suitable time-delay action so that it does not open immediately after its coil 30 is energized. The purpose of this time-delay action is so that the motor will remain energized during a regenerative-braking period but, when the motor stops or very shortly thereafter, switch 17 will open and thus prevent possible injury to the motor windings and commutator due to overheating. This also prevents waste of energy and assures that the motor will not be left in an inoperative but energized condition following regenerative-braking where it is necessary to stop the motor quickly for any reason. Any suitable time-delay switch may be used at 17 and, for the purpose of illustration, I have represented the switch as provided with a dash pot 31 to delay its opening action.

It will be noted that, when the regenerative-braking circuit is closed at contacts 25, the lower half of winding 7 is closed through brushes 13 and 14 and the commutated winding 20. It is necessary, in order to stop the motor in this manner, that the portion of the secondary winding used for this purpose have induced in it at stand-still a voltage of substantially the same amount and time phase as that between brushes 13 and 14 and also that the normal motoring circuits between brushes 9 and 10 and winding 6, also between brushes 11 and 12 and winding 7, be open.

Thus, in Fig. 2, vector A. B. may represent the voltage between brushes 13 and 14 and vector C. D. the voltage across that part of winding 7 connected across brushes 13 and 14 at standstill with the primary winding 15 of the motor energized. The dotted lines in Fig. 2 represent the desired connections for the dynamic-braking circuit in this case. At standstill and considering the brushes 13 and 14 on the same side of the motor as the winding 7, which is connected across these brushes, the rotor and stator winding parts involved may be considered as the primary and secondary of a 1 to 1 ratio transformer where the primary and secondary voltages are 180 degrees out of phase so that it is necessary to reverse connections between the two windings to have the connected primary and secondary voltages in time phase. It would, of course, be possible to have the commutator brushes and stator-winding part used for the regenerative-braking circuit displaced 180 electrical degrees from each other about the motor and not cross their interconnecting circuits.

At standstill then, the voltages in the two winding parts used for dynamic braking will be such as to cause substantially no circulating current to flow in this circuit. However, when the rotor is rotating, the voltage induced in portion 7 of the stator winding will be less than that between brushes 13 and 14 and a strong regenerative-braking torque will be exerted which is proportional to speed. If the voltages in the stator and rotor-winding parts used for dynamic braking are not made equal at standstill, they will be equal at some speed of the motor either in the forward or reverse direction so that, in such a case, either the motor will be braked down to a certain speed only or it will tend to reverse when it comes to standstill. A slight reversing torque, less than that necessary to overcome friction, will be beneficial in bringing the motor to a stop so that the voltage induced in the stator-winding part used for braking may to advantage be made slightly less than that between the brushes connected thereto at standstill. Also a slight motoring torque at standstill in the forward direction of rotation, but less than the friction of the motor, will not prevent stopping of the motor by this braking scheme. It is seen, therefore, that a slight difference between the voltages in the two winding parts used for regenerative-braking when the motor is at standstill is permissible.

In an installation where it is desired to use this braking scheme merely to reduce the speed, for example, from 1200 to 200 revolutions per minute instead of down to standstill, it is only necessary to move brushes 13 and 14 towards each other until the voltages between them is about equal to the voltage induced into stator-winding part 7 at 200 revolutions per minute. If now the motor remains energized, it will run as a motor below this speed on the regenerative-braking winding parts. By making the brushes 13 and 14 adjustable, the scheme thus lends itself to the obtaining of different regenerative-braking characteristics as related to the speed at which effective, and to an accurate adjustment thereof in this respect.

By using greater or less portions of the motor windings for braking purposes, the amount of regenerative braking may be increased or decreased and it is, of course, possible to add another set of braking brushes connected to a part of winding 6 where an exceptionally large braking effect is desired.

The voltages in the rotor and stator-winding parts which are employed for regenerative-braking purposes should be substantially in phase or 180 degrees out of phase and connected so as to be in phase for the added reason of having a good power factor in the regenerative-braking circuit as it will be obvious that otherwise we might have a large circulating current in this circuit without obtaining an equivalent braking effect.

The regenerative-braking arrangement is effective from all speeds of the motor including super-synchronous speed and is likewise effective for either direction of rotation of the motor without change in the regenerative-braking circuit connections.

In accordance with the provisions of the patent statutes I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. A commutator motor of the induction type including a primary member, a commutated winding on said primary member, a secondary member carrying a multiphase winding, and means including switches for alternately establishing connections between said multiphase winding and said commutated winding for producing motor operation and for producing regenerative-braking operation.

2. A commutator motor of the induction type comprising a primary member having a commutated winding thereon and a secondary member having a non-interlinked multiphase winding thereon, and means including commutator brushes and switches for alternately connecting said multiphase winding to said commutated winding for motor operation and for connecting portions of said windings together for regenerative-braking operation.

3. A polyphase commutator motor of the induction type having a primary member provided with a commutated winding, a secondary member provided with a non-interlinked multiphase winding, means including switching means and adjustable commutator brushes for connecting said windings together for motor operation and means including switching means and other commutator brushes for connecting portions of said windings together for regenerative motor operation, said switching means being interlocked to prevent the making of one of said connections while the other one is established.

4. A commutator motor of the induction type having a primary member carrying a commutated winding and having a primary supply circuit thereto, a secondary member carrying a non-interlinked multiphase winding, means including switches for alternately establishing connections between said multiphase and commutated windings for producing motor operation and for producing regenerative-braking operation, and an automatic switch in the primary supply circuit which is opened after a time delay following the establishment of the connections for producing regenerative-braking operation.

5. A commutator motor of the induction type having primary and secondary members, a commutated winding and commutator on said primary member, a non-interlinked multiphase winding on said secondary member, adjustable brushes on said commutator, switching means for connecting said brushes to the phase ends of said multiphase secondary, an additional pair of brushes on said commutator, switching means for connecting said additional pair of brushes to a portion of said secondary winding such that, with the motor energized at standstill and with the first mentioned switching means open, the voltage between said additional pair of brushes is substantially equal to and in phase with the voltage across the portion of the secondary winding connected thereto.

6. A commutator motor of the induction type comprising primary and secondary members, a commutated winding and commutator on the primary member, a non-interlinked multiphase winding on the secondary member, sets of adjustable brushes on said commutator, switching means for connecting said brushes to the phase ends of said secondary winding for motor operation, an additional pair of brushes on said commutator, switching means for connecting said additional pair of brushes across a portion of the secondary winding for regenerative-braking operation, the relations between said additional pair of brushes and the portion of the secondary winding connected thereto being such that, with the motor energized at standstill and with the first mentioned switching means open, substantially no current circulates in the regenerative-braking circuit, said two switching means being interlocked to prevent their both being closed at the same time.

7. An alternating-current commutator induction motor having primary and secondary members, inductively related energizing and regulating windings on said primary member, a commutator connected to the regulating winding, circuit connections including a switch for energizing said energizing winding on the primary member, a non-interlinked multiphase winding on said secondary member, adjustable brushes on the commutator, switching means for connecting said brushes to the phase ends of the secondary winding for establishing motor operation, an additional set of brushes on the commutator, switching means for connecting said additional brushes across a portion of the secondary winding such that, with the motor energized at standstill and with the switching means for establishing motor operation open, the voltages across the additional set of brushes and the portion of the secondary winding connected thereto are substantially equal and in phase, this connection being used for regenerative-braking action, means for opening the switching means for establishing motor operation when the switching means for establishing regenerative-braking operation is closed and means for opening the energizing switch of said motor after a time delay following the establishment of the regenerative-braking connection.

PERCY W. ROBINSON.